United States Patent
Aoike

(10) Patent No.: US 8,385,963 B2
(45) Date of Patent: Feb. 26, 2013

(54) PORTABLE TERMINAL APPARATUS, ITS CONTROL METHOD, AND PROGRAM

(75) Inventor: Toru Aoike, Tokyo (JP)

(73) Assignee: NEC Corporation, Tokyo (JP)

( * ) Notice: Subject to any disclaimer, the term of this patent is extended or adjusted under 35 U.S.C. 154(b) by 1286 days.

(21) Appl. No.: 12/158,372

(22) PCT Filed: Dec. 14, 2006

(86) PCT No.: PCT/JP2006/324912
§ 371 (c)(1),
(2), (4) Date: Jun. 20, 2008

(87) PCT Pub. No.: WO2007/072722
PCT Pub. Date: Jun. 28, 2007

(65) Prior Publication Data
US 2009/0233561 A1    Sep. 17, 2009

(30) Foreign Application Priority Data
Dec. 20, 2005    (JP) ................................. 2005-366787

(51) Int. Cl.
*H04B 7/00* (2006.01)

(52) U.S. Cl. ......................... 455/519; 455/518; 455/517

(58) Field of Classification Search .................. 455/517, 455/518, 519, 510, 90.1, 90.2
See application file for complete search history.

(56) References Cited

U.S. PATENT DOCUMENTS

| | | | |
|---|---|---|---|
| 4,757,536 A * | 7/1988 | Szczutkowski et al. | 380/274 |
| 5,450,611 A * | 9/1995 | Bonvallet et al. | 455/509 |
| 6,301,263 B1 * | 10/2001 | Maggenti | 370/462 |
| 6,714,795 B1 * | 3/2004 | Long et al. | 455/518 |
| 7,603,126 B2 * | 10/2009 | Rosen et al. | 455/452.1 |
| 7,623,882 B2 * | 11/2009 | Plestid et al. | 455/519 |
| 7,761,110 B2 * | 7/2010 | Chotai et al. | 455/519 |
| 7,764,971 B2 * | 7/2010 | Chu et al. | 455/518 |
| 7,792,541 B1 * | 9/2010 | El-Fishawy | 455/518 |
| 7,813,748 B2 * | 10/2010 | Suzuki et al. | 455/518 |

(Continued)

FOREIGN PATENT DOCUMENTS

| | | |
|---|---|---|
| JP | 6-57861 | 3/1989 |
| JP | 64-57861 | 3/1989 |

(Continued)

OTHER PUBLICATIONS

Japanese Official Action Notice of Rejection—2007-551050—Dec. 14, 2010.

(Continued)

*Primary Examiner* — Lewis West
(74) *Attorney, Agent, or Firm* — Young & Thompson

(57) ABSTRACT

Disclosed is a portable terminal apparatus in which there is provided a storage unit in which the setting of automatic holding of a right to talk is stored and held. In response to detection of depression of a right to talk acquisition key prepared in advance, a CPU references the setting of the automatic holding of a right to talk stored in the storage unit and, if the automatic holding of a right to talk is effective, comes into a waiting state of the right to talk acquisition, tries to acquire the right to talk at a predetermined interval, and repeats this operation until the right to talk is successfully acquired. Once acquired, the right to talk is held until a right to talk automatic holding time stored in the storage unit elapses.

11 Claims, 2 Drawing Sheets

U.S. PATENT DOCUMENTS

| | | | |
|---|---|---|---|
| 7,899,444 B2 * | 3/2011 | Hans et al. | 455/416 |
| 7,917,640 B2 * | 3/2011 | Horio et al. | 709/229 |
| 2004/0072586 A1 * | 4/2004 | Dorenbosch | 455/507 |
| 2005/0001728 A1 * | 1/2005 | Appelt et al. | 340/573.1 |
| 2005/0122922 A1 * | 6/2005 | Wu et al. | 370/310 |
| 2005/0122923 A1 * | 6/2005 | Jang et al. | 370/310 |
| 2006/0030344 A1 * | 2/2006 | Lim | 455/512 |
| 2006/0035630 A1 * | 2/2006 | Morishima et al. | 455/416 |
| 2006/0056440 A1 * | 3/2006 | Khartabil | 370/447 |
| 2006/0058052 A1 * | 3/2006 | Plestid et al. | 455/519 |
| 2006/0075095 A1 * | 4/2006 | Horio et al. | 709/224 |
| 2006/0101116 A1 * | 5/2006 | Rittman et al. | 709/204 |
| 2006/0116151 A1 * | 6/2006 | Sullivan et al. | 455/519 |
| 2007/0054686 A1 * | 3/2007 | Allen et al. | 455/518 |
| 2007/0065357 A1 * | 3/2007 | Chien | 423/518 |
| 2007/0121872 A1 * | 5/2007 | Hans et al. | 379/202.01 |
| 2007/0143478 A1 * | 6/2007 | LoGalbo et al. | 709/226 |
| 2007/0254642 A1 * | 11/2007 | Suotula | 455/422.1 |
| 2008/0201407 A1 * | 8/2008 | Fodor | 709/203 |
| 2009/0264085 A1 * | 10/2009 | Aoike | 455/90.2 |

FOREIGN PATENT DOCUMENTS

| | | |
|---|---|---|
| JP | 1-248867 | 10/1989 |
| JP | 7-303245 | 11/1995 |
| JP | 2590753 | 12/1996 |
| JP | 11-205160 | 7/1999 |
| JP | 2001-7842 | 1/2001 |
| JP | 2001-42894 | 2/2001 |
| JP | 2001-282681 | 10/2001 |
| JP | 2002-536928 | 10/2002 |
| JP | 2004-193804 | 7/2004 |
| JP | 2005-55846 | 3/2005 |
| WO | 2005/096647 | 10/2005 |

OTHER PUBLICATIONS

International Search Report PCT/JP2006/324912.
Japanese Official Action—2007-551050—Mar. 8, 2011.

* cited by examiner

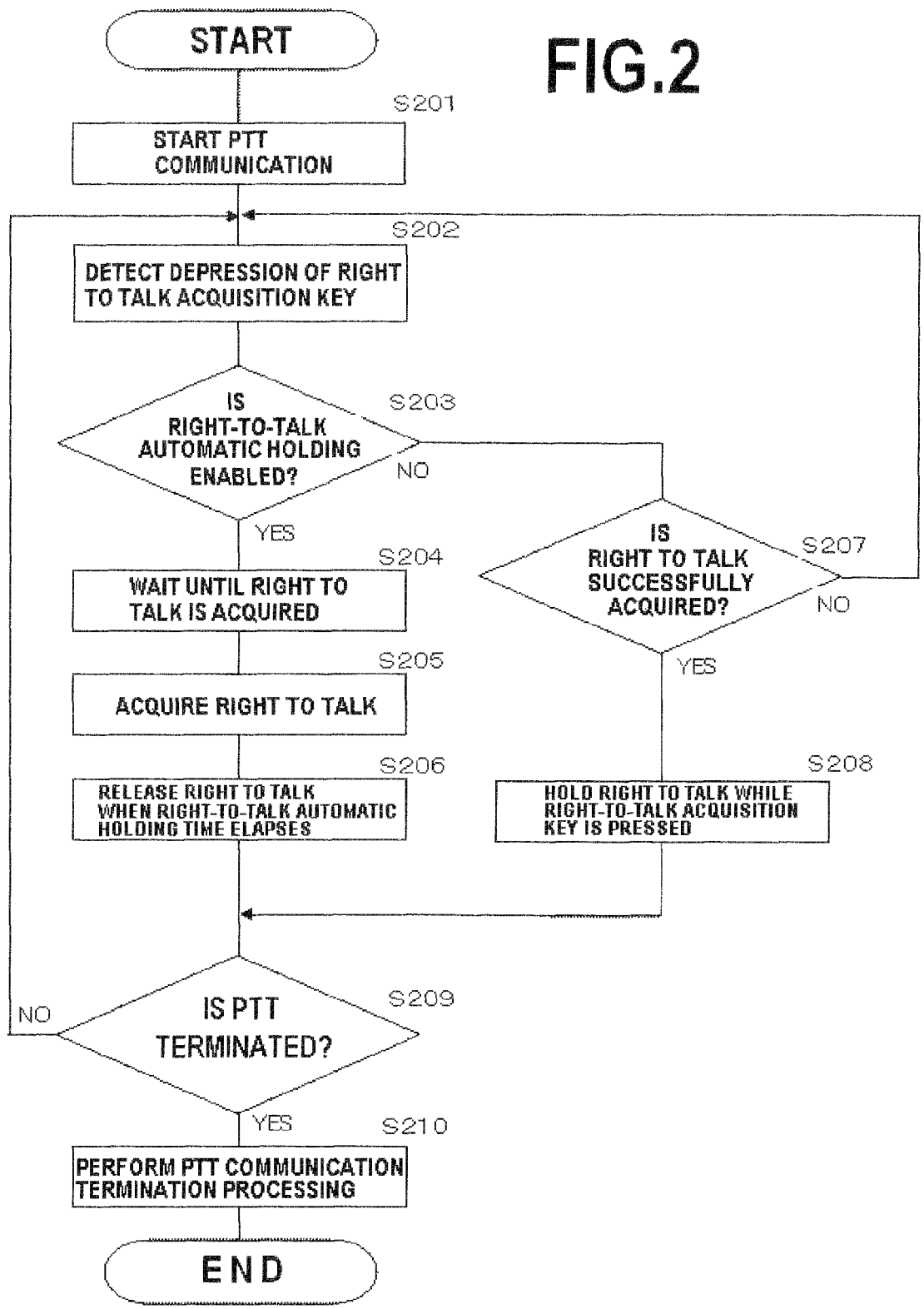

PORTABLE TERMINAL APPARATUS, ITS CONTROL METHOD, AND PROGRAM

TECHNICAL FIELD

The present invention relates to a communication terminal apparatus, and more particularly to a portable terminal apparatus equipped with the PTT (Push to Talk) function, its control method and program.

BACKGROUND ART

There are portable terminal apparatuses such as a mobile phone, a PHS (Personal Handyphone System), and a PDA (Personal Data Assistance, Personal Digital Assistants) on which the PPT (Push to Talk) communication function is installed. In the PTT communication, a right to talk is given to one user, and communication service (half-duplex speech dialog service) for one or more persons (one to one or one to a group) is provided.

As a wireless phone with the PTT communication function, Patent Document 1 discloses a wireless PTT Internet broadcast in which a wireless phone digitizes the voice of a user in response to the depression of a PTT button and sends the digitized voice, in data mode, to a base station. The base station transmits the digitized voice to the other wireless phonies, and the other wireless phones convert the received digitized voice back to voices according to the recognition result of voice frames. Patent Document 2 discloses a configuration in which, when a PTT mode is set, the speech recognition operation is performed in response to the depression of a button switch and a PTT dictionary is used for matching processing. As management of the right to talk, Patent Document 3 discloses a configuration in which the right to talk is managed by sending talk permission signal only to one wireless terminal station, which is one of multiple wireless terminal stations participating in group conversation, by means of wireless terminal station management means.

Patent Publication 1: JP2002-536928A
Patent Publication 2: JP2001-042894A
Patent Publication 3: JP Patent No. 2590753

DISCLOSURE OF THE INVENTION

Problems to be Solved by the Invention

In the PTT communication where there are many participants, a user must perform the operation of acquiring a right to talk many times until the user successfully acquires it and this operation is cumbersome. For example, when one participant has already acquired the right to talk, others cannot acquire the right to talk and they find this cumbersome.

In addition, the user must keep pressing the right to talk acquisition key in order to maintain the right to talk.

The recent trend towards a compact, lightweight mobile phone with the PTT communication function sometimes makes it difficult to reserve a space large enough for a right to talk key. So, the user sometimes finds it difficult to keep pressing the key to maintain the right to talk or, the user is forced to do the operation.

In view of the foregoing, it is an object of the present invention to provide a portable terminal apparatus and its control method and program that can automatically acquire a right to talk.

It is another object of the present invention to provide a portable terminal apparatus and its control method and program that improve operability and user interface, such as making an operation of acquiring a right to talk, an operation of holding a right to talk and the like, easier.

It is still another object of the present invention to provide a portable terminal apparatus and its control method and program that do not hinder apparatus design, such as compact design, operation keys and the like, in implementing the right to talk management function.

Means to Solve the Problems

The invention disclosed in this application has the following general configuration to solve the problems described above.

An apparatus according to one aspect of the present invention is equipped with a PTT (Push to Talk) communication function and comprises storage means that stores and holds a setting of whether or not automatic holding of a right to talk is effective; and right to talk automatic acquisition means that references the setting of the automatic holding of a right to talk stored in the storage means in response to detection of depression of a right to talk acquisition key on an input unit, and, if the automatic holding of a right to talk is set effective, repeats an operation of acquiring a right to talk, at a predefined predetermined time interval, in a right to talk acquisition wait mode, until the right to talk is successfully acquired.

In accordance with the present invention, the storage means preferably stores and holds a right to talk automatic holding time, and the portable terminal apparatus further comprises right to talk automatic holding means that performs control to hold the acquired right to talk, until the right to talk automatic holding time stored in the storage means elapses after the right to talk is acquired by the right to talk automatic acquisition means.

In accordance with the present invention, a configuration is also possible in which the portable terminal apparatus further comprises right to talk automatic holding means that performs control to hold the acquired right to talk until a predefined time elapses with a talking voice level remaining below a predetermined threshold.

In accordance with the present invention, a configuration is also possible in which the portable terminal apparatus further comprises right to talk automatic holding means that performs control to hold the acquired right to talk until the depression of the right to talk acquisition key is detected again.

In accordance with the present invention, a configuration is also possible in which the predetermined time interval, at which the right to talk automatic acquisition means repeats the operation of acquiring a right to talk, is able to be variably set.

In accordance with the present invention, a configuration is also possible in which, if the automatic holding of a right to talk is set ineffective and if a right to talk is acquired successfully, the acquired right to talk is held while the right to talk acquisition key is pressed.

In accordance with the present invention, a configuration is also possible in which the portable terminal apparatus further comprises speech recognition means that receives a voice signal and performs speech recognition wherein the right to talk automatic acquisition means performs the right to talk automatic acquisition operation based, not on the detection of depression of the right to talk acquisition key on the input unit, but on a result of the speech recognition by the speech recognition means.

A method in another aspect of the present invention is a control method of a portable terminal apparatus equipped with a PTT (Push to Talk) communication function wherein a setting of whether or not automatic holding of a right to talk is effective is stored and held in storage means, and the control method comprises:

a step of referencing the setting of the automatic holding of a right to talk, stored in the storage means, in response to detection of depression of a right to talk acquisition key; and a step of performing, if the automatic holding of a right to talk is set effective, control to repeat an operation of acquiring a right to talk at a predefined predetermined time interval, in a right to talk acquisition wait mode, until the right to talk is successfully acquired.

In accordance with the method of the present invention, a right to talk automatic holding time is stored and held in the storage means, and the control method may further comprise a step of holding the acquired right to talk until the right to talk automatic holding time stored in the storage means elapses after the right to talk is acquired.

A computer program in another aspect of the present invention is a program causing a computer, which constitutes a portable terminal apparatus that has storage means, in which a setting of whether or not automatic holding of a right to talk is effective is stored and held, and that is equipped with a PTT (Push to Talk) communication function, to execute a right to talk automatic acquisition processing in which the setting of automatic holding of a right to talk, stored in the storage means, is referenced in response to detection of depression of a right to talk acquisition key on an input unit and, if the automatic holding of a right to talk is set effective, an operation of acquiring a right to talk is repeated at a predefined predetermined time interval in a right to talk acquisition wait mode until the right to talk is successfully acquired.

The program of the present invention, wherein the storage means stores and holds a right to talk automatic holding time, may further cause the computer to execute a right to talk automatic holding processing in which the acquired right to talk is held until the right to talk automatic holding time, stored in the storage means, elapses after the right to talk is acquired.

A communication terminal apparatus of the present invention is a communication terminal apparatus that acquires a right to talk and communicates with one or more other terminals in half duplex mode and comprises means that repeats an operation of acquiring a right to talk in a waiting state of a right to talk in response to one operation for acquiring a right to talk until the right to talk is acquired successfully.

A communication terminal apparatus of the present invention comprises means that, if a right to talk is successfully acquired, holds the acquired right to talk, until a pre-set time elapses or a predetermined operation or a predetermined state is detected.

Meritorious Effects of the Invention

The present invention described above allows a user to automatically acquire a right to talk. The present invention, in which the right to talk is automatically acquired and the right to talk is automatically held at PTT communication time, advantageously makes easier the operation of acquiring a right to talk and the operation of holding a right to talk, thereby improving a user interface.

That is, because the right to talk can be automatically acquired, in the present invention, the user is required to press the key only once to acquire the right to talk even in the PTT communication in which many participants participate, thus making user's key operation easier.

Because the right to talk can be automatically held, the present invention eliminates the need for the user to keep pressing the right to talk acquisition key in order to hold the right to talk and allows the user to easily hold the right to talk even on a portable terminal apparatus having the right to talk acquisition key too small to keep pressing, thereby improving the operability.

In the present invention where there is no need to design the potable terminal apparatus large enough to allow the user to easily press the right to talk acquisition key, the portable terminal apparatus can be designed compact.

In addition, in the present invention, the right to talk acquisition key need not have an easy-to-press shape but can be shaped according to the design of the portable terminal apparatus.

In addition, in the present invention, because the right to talk can be held while the right to talk acquisition key is kept pressed as on a conventional portable terminal apparatus, the operation can be matched to that of the user's preference and, thereby improving the user interface.

BRIEF DESCRIPTION OF THE DRAWINGS

FIG. 2 is a flowchart showing the processing of one example of the present invention.

EXPLANATIONS OF SYMBOLS

Figure 1:
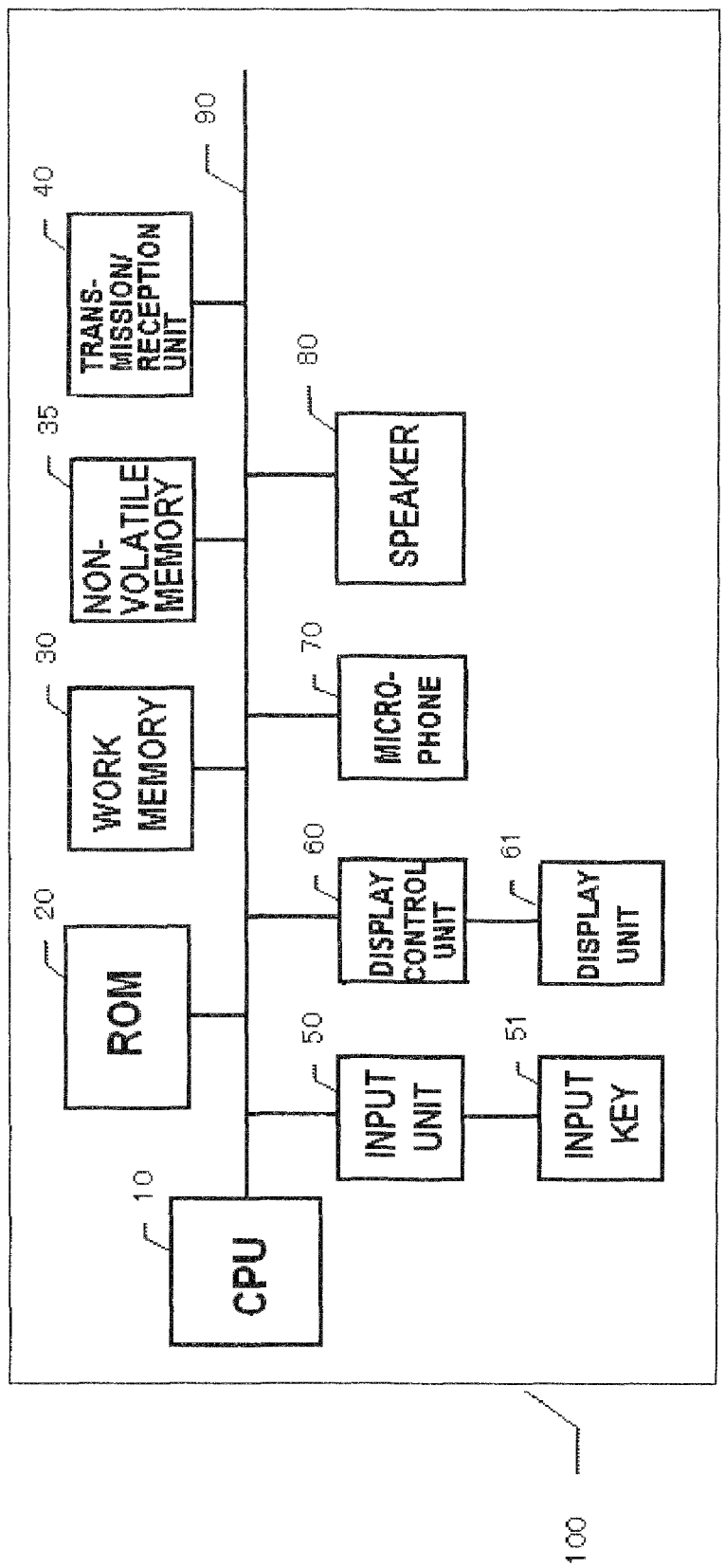
FIG. 1 is a diagram showing the configuration of one example of the present invention.

10 CPU
20 ROM
30 Work memory
35 Non-volatile memory
40 transmission/reception unit
50 Input unit
51 Input keys
60 Display control unit
61 Display unit
70 Microphone
80 Speaker
90 Bus
100 Portable terminal apparatus (mobile phone)

PREFERRED MODE FOR CARRYING OUT THE INVENTION

The above present invention will be described more in detail with reference to the attached drawings. A portable terminal apparatus of the present invention comprises means (50, 51) which performs various settings and issues a talk request during an input or a PTT communication, a CPU (10) that controls respective units in the apparatus, storage means (35) in which user settings such as automatic holding of a right to talk setting and a right to talk automatic holding time are held, means (10, 60, 61) that displays the contents of various settings, communication status and the like, sending/receiving means (40) that receives a call by wireless and performs a conversation and a PTT communication, means (70) that sends messages via a speech call or a PTT communication, and means (80) that make a sound for a melody, speech and the like.

Upon detecting the depression of a right to talk acquisition key (51) provided in advance in an input unit (50), the CPU (10) references the setting of automatic holding of a right to talk stored in the storage means (35) in response to the detection. If the automatic holding of a right to talk is effective, the CPU (10) enters the right to talk acquisition wait state and controls the acquisition of the right to talk in such a way that the CPU (10) tries to acquire the right to talk repeatedly at a predefined time interval until the right to talk is successfully acquired (right to talk automatic acquisition processing). The CPU (10) also controls the holding of the acquired right to talk in such a way that the CPU (10) holds the right to talk until the right to talk automatic holding time stored in the storage means (35) elapses (right to talk automatic holding processing). Preferably, the processing functions of the right to talk automatic acquisition processing and the right to talk automatic holding processing are implemented by programs executed on the CPU (10). The following describes a specific example of the present invention.

EXAMPLE

FIG. 1 is a diagram showing the configuration of a portable terminal apparatus in one embodiment of the present invention. FIG. 1 shows the main components of the circuit configuration of a portable terminal apparatus (mobile phone) 100. The mobile phone 100 comprises a CPU (Central Processing Unit) 10 that is connected to components of the apparatus via a bus 90.

A ROM 20, one of the components, is a read-only memory in which fixed data such as various control programs and the like for execution by the CPU 10 are stored.

A work memory 30, configured by a RAM (Random Access Memory), stores data temporarily required by the CPU 10 for executing a program.

A non-volatile memory 35 is a semiconductor memory (EEPROM, etc.) to and from which data can be written and erased freely and whose storage contents are not lost when the power is turned off. The non-volatile memory 35 can hold the user settings such as the automatic holding of a right to talk setting and the right to talk automatic holding time.

A transmission/reception unit 40 is a circuit that wirelessly performs reception and transmission of a call, conversation, and communication.

An input unit 50 is a circuit that detects a key input from input keys 51.

To speak over the PPT communication, the user must press or keep pressing a predetermined key (a special key or an off-hook key) of the input keys 51 to acquire the right to talk.

A display control unit 60 is a control circuit that controls the display of a display unit 61.

The display unit 61, provided on the front of the apparatus body not shown, is a display apparatus having a monochrome or color liquid crystal panel or an organic EL (Electro Luminescence) display apparatus.

A microphone 70 is an apparatus that sends a voice.

A speaker 80 is an apparatus that outputs a melody, a voice, a confirmation sound and the like.

FIG. 2 is a flowchart showing the operation of the embodiment. This flowchart shows the processing procedure from the time the PTT communication is started to the time the PTT communication is terminated during which the right to talk is automatically acquired and the right to talk is automatically held.

The user of the mobile phone 100 makes a call to the PTT communication participants and, at the same time, performs the PTT start processing (step S201).

When the input unit 50 detects the depression of the right to talk acquisition key by the user (step S202), an interrupt is notified to the CPU 10 that references the automatic holding of a right to talk setting stored in the non-volatile memory 35.

In case the automatic holding of a right to talk stored in the non-volatile memory 35 is effective (YES in step S203), a waiting state of acquiring a right to talk is entered (step S204).

In the waiting state of acquisition of right to talk, the CPU 10 tries to acquire the right to talk, for example, at a 5-second interval and repeats it until the right to talk is successfully acquired (right to talk automatic acquisition function). The 5-second timer management is made, for example, using a timer (not shown) in the apparatus 100 in such a way that, when the right to talk is not yet acquired but a timeout occurs, the timer is started to try to acquire the right to talk again. When the right to talk is acquired, the timer is stopped if in operation.

Once acquired (step S205), the right to talk is held (automatic holding of a right to talk function) until the right to talk automatic holding time, stored in the non-volatile memory 35, elapses (managed by the timer not shown).

If the timer not shown times out and the right to talk automatic holding time elapses, the right to talk is released (step S206).

If the automatic holding of a right to talk is disabled (NO in step S203) and if the acquisition of the right to talk succeeds (YES in step S207), the right to talk is held during the time the right to talk acquisition key is kept pressed (step S208). That is, the function of the conventional terminal is also provided.

If the automatic holding of a right to talk is disabled and if the acquisition of the right to talk fails (NO in step S207), the user presses the right to talk acquisition key again.

If the PTT communication is terminated (YES in step S209), the PTT communication termination processing is performed (step S210).

The right to talk, which can be acquired automatically in this example, is acquired with just a press of the key even in a PTT communication where there are many participants. This capability reduces the load of user's key operation.

The ability to automatically hold the right to talk eliminates the need to keep pressing the right to talk acquisition key, enabling the user to easily hold the right to talk even on a portable terminal apparatus that has the right to talk acquisition key too small for the user to find it difficult to keep pressing.

In this example where there is no need to design the terminal apparatus large enough to allow the user to easily press the right to talk acquisition key, the portable terminal apparatus can be designed compact.

In addition, the right to talk acquisition key need not have an easy-to-press shape but can be shaped according to the design of the portable terminal apparatus.

Because the right to talk can be held while the right to talk acquisition key is kept pressed as on a conventional portable terminal apparatus, the operation can be matched to user's preference.

Although the right to talk is held until the right to talk automatic holding time, stored in the non-volatile memory 35, elapses in the example described above, the same effect can be achieved also by holding the right to talk until a predefined time (for example, 10 seconds) elapses with the talking user's microphone input level remaining below a predetermined threshold.

Although the right to talk is held until the right to talk automatic holding time elapses in the example described above, it is also possible to hold the right to talk until the user presses the right to talk acquisition key again.

In addition to the key operation to acquire the right to talk, the same effect can be achieved also by the operation to acquire the right to talk by other means such as speech recognition. Although the present invention is not limited thereto, the microphone 70 connected to the bus 90 converts the analog input speech signal to the digital voice signal and supplies the converted digital voice signal to the CPU 10 via the bus 90. The speech recognition software executed in the CPU 10 recognizes the voice.

That is, the right to talk can be acquired via speech recognition by analyzing the user's voice, received via the microphone 70, by the CPU 10 and comparing the analyzed voice with a right to talk acquiring keyword (for example, "hatsugenken") registered in the ROM 20. If they match, the right to talk is acquired. Another configuration is also possible in which the speech recognition processing is performed, not by the CPU, but by connecting a speech recognition unit (not shown), such as a DSP (Digital Signal Processor), to the bus 90.

Although, in the above example, an attempt is made to acquire the right to talk at a 5-second interval in the right to talk acquisition wait state and this attempt is repeated until the right to talk is acquired successfully, the present invention of course does not limit the time interval to acquire the right to talk to 5 seconds. That is, any interval other than 5 seconds may be used. The right to talk acquisition interval may also be set by the user to any time interval via the input unit 50.

The present invention is advantageously applicable to an apparatus which is a portable terminal apparatus such as a mobile phone, a PHS (Personal Handyphone System), and a PDA (Personal Data Assistance, Personal Digital Assistants), and on which the PTT communication function is installed.

While the present invention has been described with reference to the example above, it is to be understood that the present invention is not limited to the configuration of the example above and that modifications and changes that may be made by those skilled in the art within the scope of the present invention are included.

The invention claimed is:

1. A portable terminal apparatus equipped with a PTT (Push to Talk) communication function, said apparatus comprising:
    a storage unit that stores and holds setting of whether or not automatic holding of a right to talk is made effective; and
    a CPU that references the setting of the automatic holding of a right to talk stored in said storage unit in response to detection of depression of a right to talk acquisition key on an input unit, and, if the automatic holding of a right to talk is set effective, performs control to repeat an operation of acquiring a right to talk, at a predefined predetermined time interval, in a right to talk acquisition wait mode, until the right to talk is successfully acquired.

2. The portable terminal apparatus according to claim 1, wherein said storage unit stores and holds a right to talk automatic holding time; and
    said CPU performs control to hold the acquired right to talk until the right to talk automatic holding time stored in said storage unit elapses after the right to talk is acquired.

3. The portable terminal apparatus according to claim 1, wherein said CPU performs control to hold the acquired right to talk until a predefined time elapses with a talking voice level remaining below a predetermined threshold.

4. The portable terminal apparatus according to claim 1, wherein said CPU performs control to hold the acquired right to talk until the depression of said right to talk acquisition key is detected again.

5. The portable terminal apparatus according to claim 1, wherein the predetermined time interval, at which said CPU repeats the operation of acquiring a right to talk, is able to be variably set.

6. The portable terminal apparatus according to claim 1, wherein said CPU performs control so that, if the automatic holding of a right to talk is set ineffective and if the right to talk is acquired successfully, the acquired right to talk is held while the right to talk acquisition key is pressed.

7. The portable terminal apparatus according to claim 1, wherein said CPU performs speech recognition in response to an input speech signal from a speech input unit; and
    said CPU performs the operation of acquiring a right to talk, based, not on the detection of depression of said right to talk acquisition key on said input unit, but on a result of the speech recognition.

8. A control method of a portable terminal apparatus equipped with a PTT(Push to Talk) communication function, wherein a setting of whether or not automatic holding of a right to talk is made effective is stored and held in a storage unit of said apparatus, said method comprising:
    referencing the setting of the automatic holding of a right to talk, stored in said storage unit, in response to detection of depression of a right to talk acquisition key; and
    performing, if the automatic holding of a right to talk is set effective, control to repeat an operation of acquiring a right to talk, at a predefined predetermined time interval, in a right to talk acquisition wait mode, until the right to talk is successfully acquired.

9. The control method of a portable terminal apparatus according to claim 8, wherein a right to talk automatic holding time is stored and held in said storage unit,
    said control method further comprising
    holding the acquired right to talk, until the right to talk automatic holding time stored in said storage unit elapses after the right to talk is acquired.

10. A computer program causing a computer, which constitutes a portable terminal apparatus that includes a storage unit, in which a setting of whether or not automatic holding of a right to talk is made effective is stored and held, and that has a PTT(Push to Talk) communication function, to execute a right to talk automatic acquisition processing which
    references the setting of automatic holding of a right to talk, stored in said storage unit, in response to detection of depression of a right to talk acquisition key on an input unit; and
    if the automatic holding of a right to talk is set effective, performs control to repeat an operation of acquiring a right to talk, at a predefined predetermined time interval, in a right to talk acquisition wait mode, until the right to talk is successfully acquired.

11. The program according to claim 10, wherein said storage unit stores and holds a right to talk automatic holding time;
    said program further causing said computer to execute a right to talk automatic holding processing which holds the acquired right to talk until the right to talk automatic holding time, stored in said storage unit, elapses after the right to talk is acquired.

* * * * *

UNITED STATES PATENT AND TRADEMARK OFFICE
CERTIFICATE OF CORRECTION

PATENT NO. : 8,385,963 B2
APPLICATION NO. : 12/158372
DATED : February 26, 2013
INVENTOR(S) : Toru Aoike It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1287 days.

Signed and Sealed this

First Day of September, 2015

Michelle K. Lee
*Director of the United States Patent and Trademark Office*